US009006508B2

(12) United States Patent
Kanazirev et al.

(10) Patent No.: US 9,006,508 B2
(45) Date of Patent: Apr. 14, 2015

(54) PROTECTED ADSORBENTS FOR MERCURY REMOVAL AND METHOD OF MAKING AND USING SAME

(75) Inventors: Vladislav Ivanov Kanazirev, Des Plaines, IL (US); Dante A. Simonetti, Des Plaines, IL (US); Peter Rumfola, III, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 199 days.

(21) Appl. No.: 13/367,345

(22) Filed: Feb. 6, 2012

(65) Prior Publication Data

US 2013/0204065 A1 Aug. 8, 2013

(51) Int. Cl.
| C07C 7/12 | (2006.01) |
| B01D 15/00 | (2006.01) |
| B01D 53/64 | (2006.01) |
| B01J 20/02 | (2006.01) |
| B01J 20/06 | (2006.01) |
| B01J 20/28 | (2006.01) |
| B01J 20/32 | (2006.01) |
| C10G 25/00 | (2006.01) |

(52) U.S. Cl.
CPC .............. *C10G 25/003* (2013.01); *B01D 15/00* (2013.01); *B01D 53/64* (2013.01); *B01D 2253/1124* (2013.01); *B01D 2253/25* (2013.01); *B01D 2257/602* (2013.01); *B01J 20/0237* (2013.01); *B01J 20/06* (2013.01); *B01J 20/28011* (2013.01); *B01J 20/3204* (2013.01); *B01J 20/3236* (2013.01); *B01J 20/3238* (2013.01); *B01J 20/3289* (2013.01); *B01J 20/3293* (2013.01); *C10G 2300/202* (2013.01); *C10G 2300/205* (2013.01)

(58) Field of Classification Search
USPC ................... 585/823, 824; 208/253; 95/134; 423/244.01–244.04; 210/679; 502/407, 502/414, 415
See application file for complete search history.

(56) References Cited

U.S. PATENT DOCUMENTS

| 4,793,980 A | * | 12/1988 | Torobin | .................... 423/213.5 |
| 5,120,515 A | | 6/1992 | Audeh et al. | |
| 5,397,759 A | * | 3/1995 | Torobin | ........................ 502/415 |
| 6,689,714 B2 | * | 2/2004 | Wheelock et al. | ............. 502/400 |
| 6,736,882 B2 | * | 5/2004 | Kanazirev et al. | .............. 96/108 |
| 7,014,689 B2 | | 3/2006 | Van Lookeren et al. | |
| 2006/0191821 A1 | | 8/2006 | Nicolaos et al. | |

(Continued)

FOREIGN PATENT DOCUMENTS

| CA | 2619356 A1 | 2/2007 |
| JP | 2005330305 | 12/2005 |

(Continued)

OTHER PUBLICATIONS

LeVan et al., "Adsorption and Ion Exchange," 2008, McGraw-Hill, Perry's Chemical Engineers' Handbook 8th edition, p. 16-10.*

(Continued)

*Primary Examiner* — Tam M. Nguyen
*Assistant Examiner* — Candace R Chouinard

(57) ABSTRACT

A method of removing mercury and/or sulfur from a fluid stream comprising contacting the fluid stream with a sorbent comprising a core and a porous shell formed to include a plurality of pores extending therethrough and communicating with the core. The core comprises a copper compound selected from the group consisting of a basic copper oxysalt, a copper oxide, and a copper sulfide.

13 Claims, 2 Drawing Sheets

(56) References Cited

U.S. PATENT DOCUMENTS

2008/0041227 A1 2/2008 Mulvaney, III et al.
2010/0326886 A1 12/2010 Kanazirev et al.

FOREIGN PATENT DOCUMENTS

WO 9115559 A2 10/1991
WO WO9532049 A1 * 11/1995

OTHER PUBLICATIONS

AVCO Corporation, Space Systems Division, Advanced Chemical Processes Section, Final Report, A Survey of Metal Oxides as Sorbents for Oxides of Sulfur, Contract No. 86-67-51, AVSSD-0043-69-RR, Feb. 1969, Lowel Massachusetts (85 pages).

* cited by examiner

PROTECTED ADSORBENTS FOR MERCURY REMOVAL AND METHOD OF MAKING AND USING SAME

FIELD OF THE INVENTION

The disclosure relates in general to the removal of contaminants from hydrocarbon liquid or gas streams. In certain embodiments, the disclosure relates to the use of a copper-based sorbent to remove mercury from hydrocarbon streams. In certain embodiments, the disclosure relates to the use of a protected and highly loaded copper-based sorbent core to remove sulfur and/or mercury from hydrocarbon streams.

BACKGROUND OF THE INVENTION

Hydrocarbon fluid streams, including both liquid and gas streams, are often contaminated with sulfur and mercury compounds. Sorbents containing supported metal sulfides, such as cupric sulfide (CuS), have been used to scavenge mercury from hydrocarbon fluid streams. For example, U.S. Pat. No. 4,094,777 describes a solid mass that contains a carrier and sulfided copper as an absorbent for mercury from a gas or a liquid. CuS based materials for Hg removal are offered by Axens, Johnson Matthey (JM) and others for applications in the natural gas and hydrocarbon industries.

Sorbents containing supported metal oxides, such as cupric oxide (CuO), have been used to remove both sulfur and mercury from hydrocarbon fluid streams. For example, U.S. Pat. No. 7,645,306 describes an absorbent containing copper oxide (CuO) to adsorb sulfur and mercury.

It has been observed that the mercury scavenged from the fluid stream concentrates on the surface of the copper-based sorbent, creating a thin mercury-rich shell. As such, prior art sorbents suffer from at least two problems. First, the mercury-containing shell is brittle and tends to easily break free from the sorbent, resulting in the production of mercury-rich particulates. The resulting particulates create safety and environmental hazards. For example, movement of saturated sorbent beads during replacement may lead to the release of mercury into the environment. In addition, the release of particulates during production use, such as during bed disturbances, abrasion, or process upsets, will result in an increased pressure drop as the released particulates disrupt the flow of material around the sorbent beads.

Second, only the outer portion of the active copper material is used for mercury scavenging, resulting in poor utilization of the active component. Accordingly, there is a need for mercury or sulfur/mercury sorbents that (i) are capable of retaining their structure and are less likely to shed mercury-rich particulates and (ii) have a higher level of active component utilization.

SUMMARY OF THE INVENTION

A method of removing mercury and/or sulfur from a fluid stream is presented. The method comprises contacting the fluid stream with a sorbent having a core and a shell formed to include a plurality of pores extending therethrough and communicating with the core. The core further comprises a copper compound.

An adsorbent particle is also presented. The adsorbent particle comprises a core comprising a copper compound and a porous shell disposed over the core. The porous shell is formed to include a plurality of pores extending therethrough and communicating with the core. The porous shell comprises no copper compound.

DETAILED DESCRIPTION OF PREFERRED EMBODIMENTS

Figure 1:
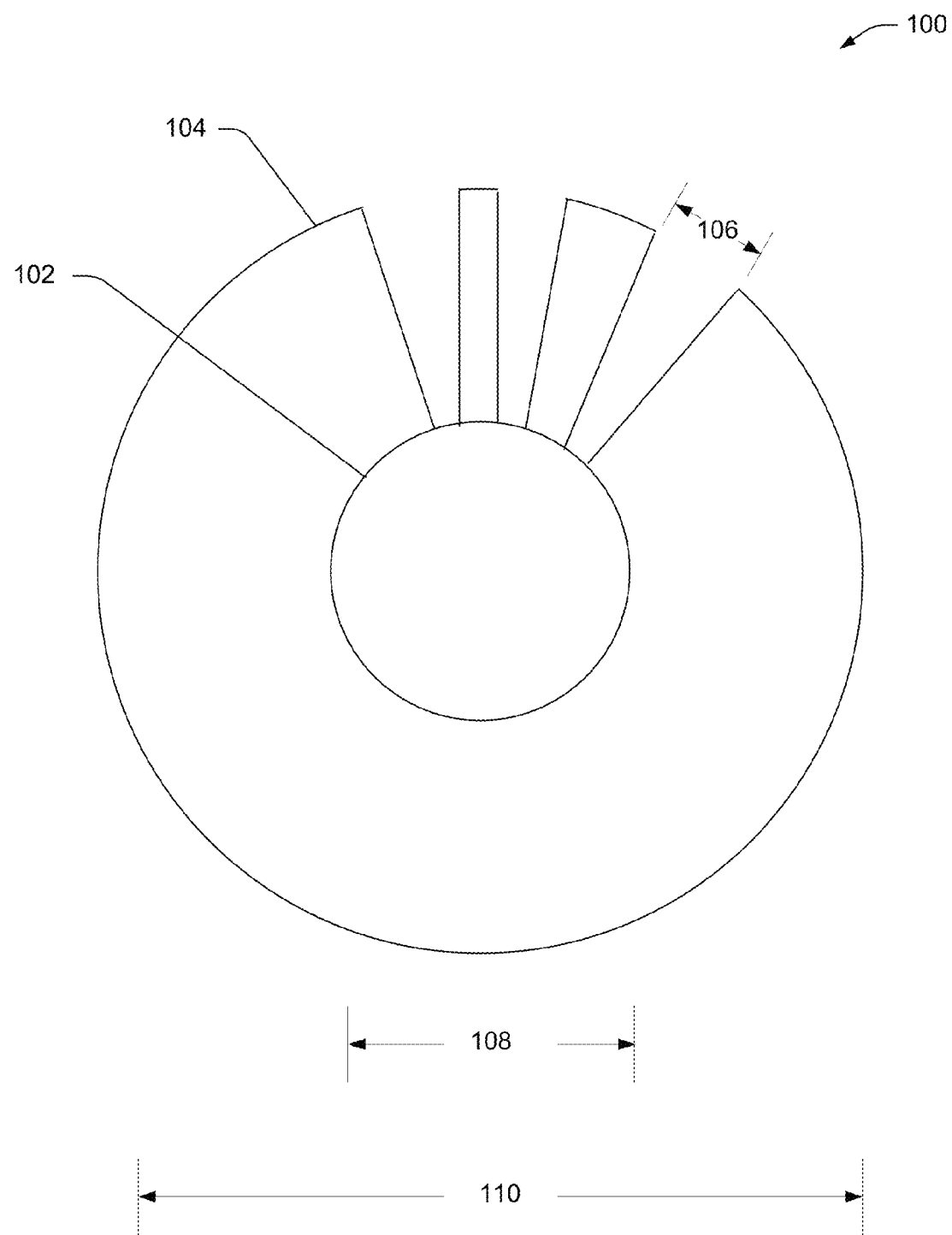
FIG. 1 is a simplified cross section of Applicants' sorbent prior to use.

The invention is described in preferred embodiments in the following description with reference to the Figures, in which like numerals represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The terms sorbent, adsorbent, and absorbent as used herein refer to the ability of a material to take in or soak up liquid or gas components on the surface thereof or to assimilate such components into the body thereof.

Prior art sorbents generally consist of a basic copper carbonate, a copper oxide, or a copper sulfide material disposed throughout a porous metal oxide support, such as alumina, and formed into ahead. The copper sulfide in the sorbent reacts with mercury in the fluid to create mercuric sulfide (HgS) by reaction (1).

$$2CuS + Hg \rightarrow HgS + Cu_2S \qquad (1)$$

When used in a sulfur-containing fluid stream, the copper oxide is converted to copper sulfide by reaction (2), the copper sulfide then reacts with mercury via reaction (1).

$$CuO + H_2S \rightarrow CuS + H_2O \qquad (2)$$

The overall reaction of the copper oxide with sulfur and mercury is shown in reaction (3).

$$2CuO + Hg + 2H_2S \rightarrow HgS + Cu_2S + 2H_2O \qquad (3)$$

In an alternate reaction, basic copper carbonate reacts with $H_2S$ as shown in reaction (4).

$$Cu_2(OH)_2CO_3 + 2H_2S \rightarrow 2CuS + CO_2 + 3H_2O \qquad (4)$$

The resulting CuS then reacts with mercury in the stream according to reaction 1. The overall reaction in this case is shown in reaction (5).

$$Cu_2(OH)_2CO_3 + 2H_2S + Hg \rightarrow HgS + Cu_2S + CO_2 + 3H_2O \qquad (5)$$

It has been observed that mercury is absorbed primarily on the surface of the sorbent to form a mercury-rich shell. Even though the active component (i.e., CuS) is dispersed throughout the absorbent, only the portion of the active material near the surface of the sorbent reacts with the mercury. As such, the active material in the interior of the sorbent bead is not utilized.

In addition, highly-loaded absorbents made according to the prior art suffer from a number of drawbacks. First, an increase in the active copper component (i.e., a more heavily loaded sorbent) will result in greater potential for mercury-containing particulate formation as a result of less supporting material to secure the mercury-containing shell after formation. Second, an increase in the ratio of active copper to supporting material decreases the structural integrity of the sorbent prior to use, resulting in reduced crush strength, increased particulate formation, and lower operational performance.

In one embodiment, Applicants' sorbent comprises a porous shell around a core comprising active material. The porous shell of Applicants' sorbent provides structural support to allow for a highly-loaded copper core. In one embodiment, the porous shell of Applicants' sorbent contains support material only and therefore comprises a sorbent having a higher crush strength than prior art copper-containing sorbents.

In certain embodiments, Applicants' sorbent comprises a small and highly loaded copper core. In certain embodiments, the core comprises a copper-containing active component disposed within a support material. A highly porous material is disposed over the core to form a shell. The shell has pores sized to allow mercury- and/or sulfur-containing compounds to pass into the sorbent and contact copper-containing active components in the core. As mercury is scavenged, a mercury-rich layer forms within the sorbent at the interface between the core and the highly porous shell. As a result, the highly porous shell surrounds and retains the fragile mercury-rich layer and prevents the release of mercury-containing particulates.

In various embodiments, Applicants' sorbent is used to remove elemental mercury from hydrocarbon fluid (i.e., liquid or gas) streams. In various embodiments, Applicants' sorbent is used to remove sulfur and sulfur-containing compounds (collectively, sulfur), such as without limitation $H_2S$ and/or mercaptans, from hydrocarbon fluid (i.e., liquid or gas) streams.

Referring to FIG. 1, a simplified drawing 100 of a cross section of Applicants' sorbent bead is depicted. A core 102 comprising supported copper sulfide is disposed within a porous shell 104. A plurality of pores 106 extend through the shell and communicate with the core, thereby allowing contaminant materials to pass through the porous shell 104 and contact the core 102. The pores 106 depicted are simplified for explanatory purposes and should not be interpreted as limiting. As would be appreciated by those skilled in the art, the pores in the porous shell will be irregularly-shaped channels that often intersect with each other. The core has a diameter 108 and the porous shell has an outer diameter 110. In certain embodiments, a ratio between the core diameter 108 and the porous shell diameter 110 (i.e., the outer diameter of the sorbent) is between about 0.3 and about 0.99. In certain embodiments, the porous shell diameter 110 is between about 0.5 mm and 20 mm. In certain embodiments, the porous shell diameter 110 is between about 1.5 mm and 10 mm.

In certain embodiments, Applicants' sorbent core comprises a copper compound. In certain embodiments, Applicants' sorbent core comprises a copper compound disposed within a support material. In various embodiments, the sorbent core comprises a copper oxysalt, such as without limitation basic copper carbonate, disposed within a support material. In various embodiments, the sorbent core comprises a copper oxide and a halide salt disposed within a support material. In various embodiments, the sorbent core comprises a copper sulfide disposed within a support material. In various embodiments, the sorbent core comprises a copper sulfide and a halide salt disposed within a support material. In certain embodiments, the copper sulfide is cupric sulfide (CuS). In certain embodiments, the copper sulfide is cuprous sulfide ($Cu_2S$). In certain embodiments, the copper oxide is cupric oxide (CuO). In certain embodiments, the copper oxide is cuprous oxide ($Cu_2O$).

In various embodiments, the support material is a metal oxide selected from the group consisting of alumina, silica, silica-aluminas, silicates, aluminates, silico-aluminates such as zeolites, titania, zirconia, hematite, ceria, magnesium oxide, and tungsten oxide. In one embodiment, the support material is alumina. In some embodiments, the support material is carbon or activated carbon. In certain embodiments, Applicants' sorbent does not comprise a binder.

In various embodiments, the alumina support is present in the form of transition alumina, which comprises a mixture of poorly crystalline alumina phases such as "rho," "chi" and "pseudo gamma" aluminas which are capable of quick rehydration and can retain substantial amounts of water in a reactive form. An aluminum hydroxide $Al(OH)_3$, such as gibbsite, is a source for preparation of transition alumina. The prior art industrial process for production of transition alumina includes milling gibbsite to 1-20 μm particle size followed by flash calcination for a short contact time as described in the patent literature such as in U.S. Pat. No. 2,915,365. Amorphous aluminum hydroxide and other naturally found mineral crystalline hydroxides e.g., Bayerite and Nordstrandite or monoxide hydroxides, AlOOH, such as Boehmite and Diaspore can be also used as a source of transition alumina. In one embodiment, the BET surface area of this transition alumina material is about 300 $m^2/g$ and the average pore diameter is about 45 angstroms as determined by nitrogen adsorption.

In various embodiments, a solid oxysalt of a transition metal is used as a starting component of the sorbent core. In certain embodiments, the solid oxysalt is converted to other copper compounds in subsequent processing steps. In other embodiments, all or a portion of the solid oxysalt remains in the final sorbent product. "Oxysalt," by definition, refers to any salt of an oxyacid. Sometimes this definition is broadened to "a salt containing oxygen as well as a given anion." FeOCl, for example, is regarded as an oxysalt according this definition.

In certain embodiments, the oxysalt comprises one or more copper carbonates. Basic copper carbonates, such as $Cu_2CO_3(OH)_2$, can be produced by precipitation of copper salts, such as $Cu(NO_3)$, $CuSO_4$ and $CuCl_2$, with sodium carbonate. In one embodiment, a synthetic form of malachite, a basic copper carbonate, produced by Phibro Tech, Ridgefield Park, N.J., is used as a component of the sorbent core.

Depending on the conditions used, and especially on washing the resulting precipitate, the final material may contain some residual product from the precipitation process. In the case of the $CuCl_2$ raw material, sodium chloride is a side product of the precipitation process. Applicant has found that a commercially available basic copper carbonate that had both residual chloride and sodium, exhibited lower stability towards heating and improved resistance towards reduction than other commercial basic copper carbonates that were practically chloride-free.

In one embodiment, the particle size of the basic copper carbonate particles is approximately in the range of that of the transition alumina, namely 1-20 μm. In other embodiments, the sorbent core comprises the oxysalt Azurite, $Cu_3(CO_3)_2(OH)_2$. In other embodiments, the sorbent core comprises an oxysalt of copper, nickel, iron, manganese, cobalt, zinc or a mixture thereof.

In certain embodiments, the sorbent core is produced by calcinating a mixture of an inorganic halide additive and basic copper carbonate for a sufficient period of time to decompose the basic copper carbonate into an oxide. In various embodiments, the inorganic halides are sodium chloride, potassium chloride or mixtures thereof. In certain embodiments, the inorganic halides are bromide salts. In various embodiments, the chloride content in the core of the sorbent ranges from 0.05 to 2.5 mass percent. In various embodiments, the chloride content in the sorbent core ranges from 0.3 mass percent to 1.2 mass percent. The copper oxide-based sorbent core that contains the halide salt exhibits a higher resistance to reduction than does a similar sorbent core that is made without the halide salt. In certain embodiments, the halide is chloride.

In certain embodiments, the sorbent core is produced by sulfiding a copper oxide material. For example, in one embodiment, a cupric oxide-based sorbent core (CuO) is sulfided by exposure to $H_2S$ at about 150° C. to form a cupric sulfide-based sorbent core (CuS). In one embodiment, the cupric oxide-based sorbent core is sulfided by trace sulfur in the mercury-containing fluid stream being treated. In one embodiment, the cupric oxide-based sorbent core is sulfided prior to exposure to the mercury-containing fluid stream. In some embodiments, the copper oxide is only partially sulfided, resulting in a sorbent core comprising both copper oxide and copper sulfide. In various embodiments, the percentage of copper-containing material in the sorbent core as a percentage of the sorbent core is between about 25 mass percent and about 90 mass percent. In various embodiments, the mass ratio of copper compounds (excluding copper sulfide) to copper sulfide in the sorbent core is about 0.1 to 0.7. Those skilled in the art will appreciate that other methods of sulfidation may be performed to achieve copper sulfide-containing sorbent cores.

In various embodiments, and depending on the application, the sorbent core comprises about 8 mass percent copper to about 95 mass percent copper, calculated as CuO on a volatile-free basis. In one embodiment, the sorbent core comprises about 10 mass percent copper calculated as CuO on a volatile-free basis. In one embodiment, the sorbent core comprises about 40 mass percent copper calculated as CuO on a volatile-free basis. In one embodiment, the sorbent core comprises about 65 mass percent copper calculated as CuO on a volatile-free basis. In one embodiment, the sorbent core comprises about 70 mass percent copper calculated as CuO on a volatile-free basis.

In one embodiment, the sorbent core is produced by con-odulizing basic copper carbonate with alumina followed by curing and activation. In various embodiments, the nodulizing, or agglomeration, is performed in a pan or a drum. The materials are agitated by the oscillating or rotating motion of the nodulizer while spraying with water to form beads. In one embodiment, the water is replaced with weak sodium chloride in a concentration sufficient to achieve up to 0.8 mass percent chloride in the final dried product. In one embodiment, the beads are cured at about 60° C. and dried in a moving bed activator at a temperature at or below about 175° C. In other embodiments, the sorbent cores are formed by extrusion. In certain embodiments, the sorbent cores are porous, having a plurality of voids and channels running therethrough.

Those skilled in the art will appreciate that other methods may be performed to achieve a metal oxide- and/or metal sulfide-containing sorbent core compatible with Applicants' invention.

A protective coating, in the form of a porous shell, is disposed over the sorbent core. In one embodiment, the coating comprises silica formed by applying colloidal metal silica to the sorbent core by the methods disclosed in U.S. Pat. No. 6,736,882, which is incorporated herein by reference. In various embodiments, the colloidal metal silica shell is between about 1 mass percent to about 2 mass percent of the sorbent. In various embodiments, the thickness of the colloidal metal silica shell is between about 10 μm and about 150 μm. The colloidal metal silica shell is porous an as to permit mercury- and/or sulfur-containing compounds to penetrate and react with the copper-containing material in the sorbent core. In addition, the colloidal metal silica shell increases the structural integrity of the sorbent, preventing the release of mercury-rich particulates, enabling the use of sorbent cores that are more highly loaded with copper, and enabling higher utilization of the active copper component of the sorbent core, as compared to the prior art.

In one embodiment, the coating is formed by co-nodulizing the sorbent core with alumina. Highly porous shells of varying thicknesses can be formed in this manner by varying, without limitation, the method of nodulizing, the nodulizing time, and the type of alumina used. As would be appreciated by those skilled in the art, Applicants' sorbent could be formed by other methods of creating a highly porous shell over the sorbent core.

In various embodiments, the thickness of the alumina shell is between about 100 μm and about 1500 μm. In one embodiment, the BET surface area of the alumina shell is about 280 $m^2/g$ and the average pore diameter is at least about 45 Angstroms as determined by nitrogen adsorption. In one embodiment, the coating is mesoporous (i.e., having pores between about 2 to about 50 nm in diameter). In one embodiment, the coating is macroporous (i.e., having pores>50 nm in diameter comprising at least one third of the total pore volume).

In certain embodiments, the alumina shell is large, such that the core is only about 3 mass percent to about 15 mass percent of the sorbent.

In certain embodiments, the shell comprises a metal oxide selected from the group consisting of alumina, silica, silica-aluminas, silicates, aluminates, silico-aluminates such as zeolites, titania, zirconia, hematite, ceria, magnesium oxide, and tungsten oxide. In one embodiment, the shell comprises alumina. In some embodiments, the shell comprises carbon or activated carbon. In certain embodiments, the shell does not comprise a binder. In certain embodiments, the shell comprises no copper oxide.

In some embodiments, the shell is activated so as to scavenge sulfur or other impurities. In various embodiments, activation comprises forming or incorporating a reactive material in or on the shell, such as a copper oxide, nickel oxide, iron oxide, manganese oxide, cobalt oxide, zinc oxide, or a combination thereof. In one embodiment, incorporation comprises adding the oxide to the mixture of sorbent cores and alumina before or during agglomeration. In certain embodiments, the activation comprises incorporating a copper sulfide, such as CuS or $Cu_2S$, in the shell. In certain embodiments, the reactive material does not contain copper oxide.

In some embodiments, the shell is activated so as to scavenge undesirable components other than mercury from the fluid stream, such as chlorine. In some embodiments, the shell is activated so as to function as a molecular sieve to capture undesirable components other than mercury from the fluid stream, such as chlorine.

The alumina shell provides structural support to the sorbent, thereby (i) preventing the release of mercury-rich particulates, (ii) enabling the use of sorbent cores highly loaded with copper, (iii) enabling high utilization of the active copper component of the sorbent core, and (iv) increasing the crush strength of the sorbent. In one embodiment, the sorbent cores comprises greater than about 10 mass percent copper oxide and the porous sorbent shell comprises no copper oxide.

In one embodiment, the sorbent cores are 7×14 mesh (2.8 mm×1.4 mm) or smaller. After formation of the shell, the sorbents are, in different embodiments, 3×6 mesh (6.7 mm×3.3 mm) or 5×8 mesh (4.0 mm×2.4 mm). In a different embodiment, the sorbents are greater than 3×6 mesh (6.7 mm×3.3 mm).

As used herein, an "A×B mesh (C mm×D mm)" is representative of the size range of sorbent particles. In this example, the mesh is used to isolate sorbent particles that are able to pass through a C mm mesh (i.e., C mm square openings), but are not able to pass through a D mm mesh (i.e., D mm square openings). For example, a 7×14 mesh (2.8 mm×1.4 mm) will trap sorbent beads or irregularly shaped particles that have a minimum dimension greater than 1.4 mm and less than 2.8 mm.

Applicants' sorbent beads having a large particle size (for example, greater than about 3 mm), a macroporous shell (for example, at least 250 m$^2$/g BET surface area with a total pore volume, as determined by mercury intrusion of at least 0.3 cm$^2$/g, and including macropores greater than about 50 nanometers of at least 0.08 cm$^2$/g), and a small sorbent core (about 3% to about 15% of the weight of the sorbent) are particularly well suited to applications where a low pressure drop is desirable. In one embodiment, the bulk density of such sorbents is between about 721 kg/m$^3$ (45 lbs/ft$^3$) to about 1281 kg/m$^3$ (80 lbs/ft$^3$). In one embodiment, the bulk density of such sorbents is 993 kg/m$^3$ (62 lbs/ft$^3$). In one embodiment, the bulk density of such sorbents is 800 kg/m$^3$ (50 lbs/ft$^3$).

Figure 2:
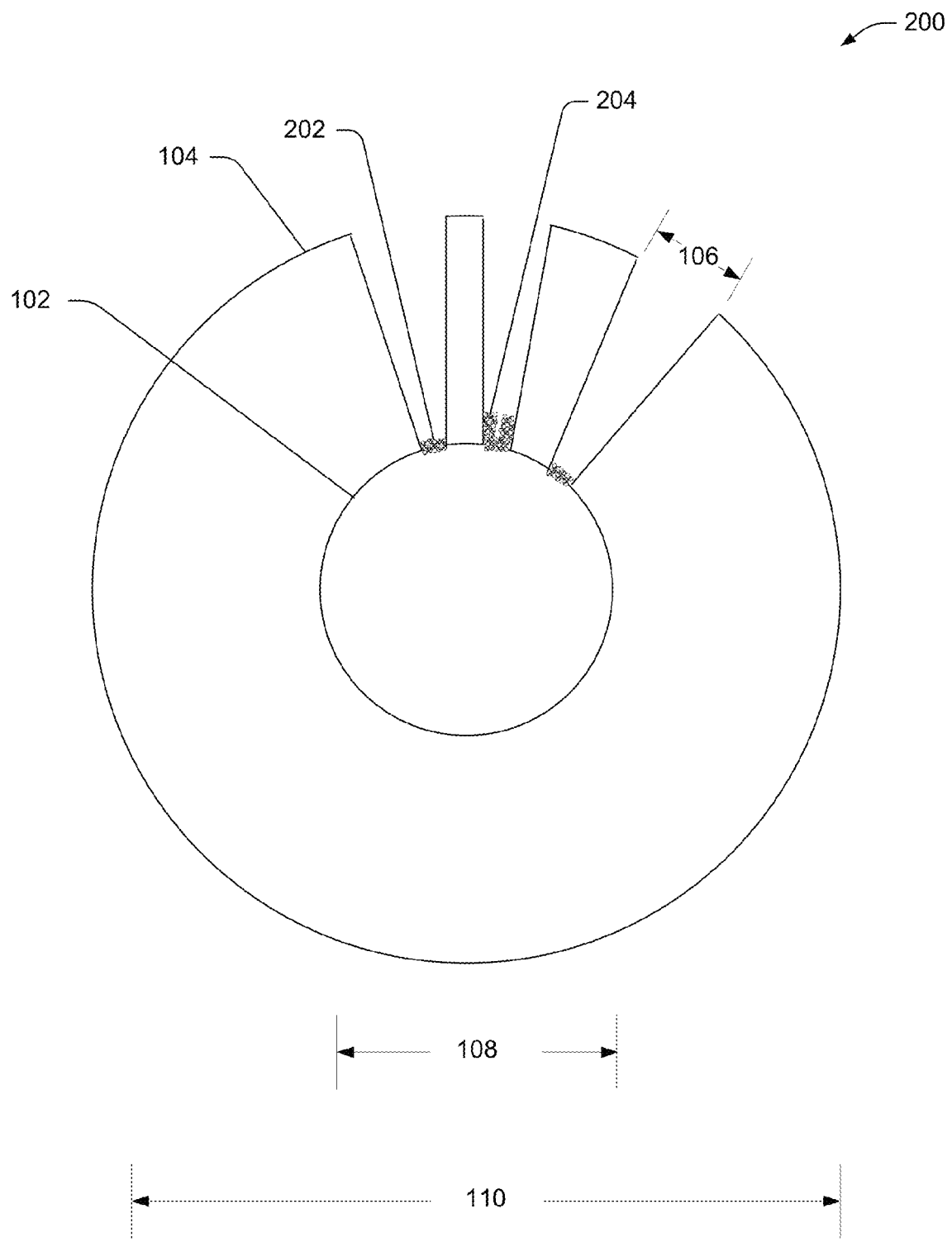
FIG. 2 is a simplified cross section of Applicants' sorbent after exposure to a mercury-containing stream.

Referring to FIG. 2, a simplified drawing 200 of a cross section of Applicants' sorbent bead with scavenged mercury, after being exposed to a fluid (i.e., gas or liquid) stream, is depicted. The mercuric sulfide 202 forms at the bottom of the plurality of pores 106 at the intersection of the core 102 and the shell 104. The shell 104 protects and stabilizes the core 102 and the mercuric sulfide 202. As such, mercury-containing compounds are less likely to be released as a result of disruptions to the sorbent beads during processing and post-process handling. In addition, the shell 104 adds structural support, giving the sorbent beads increased crush strength. In certain embodiments, mercuric sulfide is formed within the pores 106 of shell 104 as a result of reaction with other sources of sulfur (i.e., sulfur other than that in the form of cupric sulfide in the core), as indicated by 204. Mercuric sulfide formed in this manner is trapped in the shell. As a result, the amount of mercuric sulfide in some embodiments of Applicants' sorbents after being exposed to a mercury-containing stream exceeds the theoretical limits imposed by reaction (4).

$$2CuS + Hg \rightarrow HgS + Cu_2S \qquad (4)$$

The described features, structures, or characteristics of the invention may be combined in any suitable manner in one or more embodiments. In the above description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. In other words, the present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

What is claimed is:

1. A method of removing from a fluid stream at least one impurity selected from the group consisting of mercury and sulfur comprising contacting said fluid stream with a sorbent comprising a core and a porous shell formed to include a plurality of pores extending therethrough and communicating with said core, wherein said core comprises a copper compound selected from the group consisting of a basic copper oxysalt, a copper oxide, and a copper sulfide, wherein said sorbent comprises a bulk density of between about 721 kg/m3 (45 lbs/ft3) to about 1281 kg/m3 (80 lbs/ft3) and wherein said core has a particle size between 1-20 μm.

2. The method of claim 1, wherein said core comprises a first diameter and said porous shell comprises a second diameter, wherein a ratio between said first diameter and said second diameter is between about 0.3 and about 0.99.

3. The method of claim 1, wherein said porous shell comprises a metal oxide selected from the group consisting of alumina, silica, silica-aluminas, silicates, aluminates, silico-aluminates, zeolites, titania, zirconia, hematite, ceria, magnesium oxide, and tungsten oxide.

4. The method of claim 3, wherein said porous shell comprises no copper oxide.

5. The method of claim 4, wherein said metal oxide comprises silica.

6. The method of claim 5, wherein said porous shell comprises about 1 mass percent to about 5 mass percent of said sorbent.

7. The method of claim 4, wherein:
said core is about 3 mass percent to about 30 mass percent of said sorbent; and
said copper compound is disposed on a metal oxide substrate.

8. The method of claim 7, wherein said sorbent comprises a bulk density of less than 800 kg/m$^3$ (50 lbs/ft$^3$).

9. The method of claim 4, wherein said copper compound comprises between about 8 mass percent and about 95 mass percent of said core, calculated as CuO on a volatile-free basis.

10. The method of claim 4, wherein said copper compound is a copper oxide.

11. The method of claim 1, further comprising forming mercuric sulfide in said plurality of pores adjacent to said core, wherein said impurity comprises mercury.

12. The method of claim 1, wherein said porous shell comprises a reactive material.

13. The method of claim 12, wherein said reactive material does not contain copper oxide.

* * * * *